(12) United States Patent
Guillou et al.

(10) Patent No.: US 8,629,898 B2
(45) Date of Patent: Jan. 14, 2014

(54) STEREOSCOPIC VIDEO DELIVERY

(75) Inventors: Jean-Pierre Guillou, La Jolla, CA (US);
Seungwook Hong, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 980 days.

(21) Appl. No.: 12/383,388

(22) Filed: Mar. 24, 2009

(65) Prior Publication Data
US 2010/0053305 A1    Mar. 4, 2010

Related U.S. Application Data

(60) Provisional application No. 61/190,990, filed on Sep. 3, 2008.

(51) Int. Cl.
*H04N 15/00* (2006.01)

(52) U.S. Cl.
USPC ............................................ 348/43

(58) Field of Classification Search
USPC ................................... 348/42, 43
See application file for complete search history.

(56) References Cited

U.S. PATENT DOCUMENTS

| | | |
|---|---|---|
| 3,697,675 A | 10/1972 | Beard et al. |
| 5,612,735 A | 3/1997 | Haskell et al. |
| 2005/0041736 A1 | 2/2005 | Butler-Smith et al. |
| 2005/0175083 A1 | 8/2005 | Gutierrez Novelo |
| 2006/0044388 A1 | 3/2006 | Kim et al. |
| 2006/0221178 A1 | 10/2006 | Yun et al. |
| 2008/0094468 A1 | 4/2008 | Tseng et al. |
| 2008/0151040 A1 * | 6/2008 | Kim ................................ 348/42 |
| 2008/0198218 A1 | 8/2008 | Liu et al. |
| 2012/0189278 A1 * | 7/2012 | Oshima et al. ............... 386/248 |

FOREIGN PATENT DOCUMENTS

WO    WO 0197531 A2    12/2001

OTHER PUBLICATIONS

International Search Report and Written Opinion of the International Searching Authority, PCT/US2009/055603, Mailed Apr. 26, 2010.
"Low-Cost Stereoscopic High-Definition Video over IP Networks for Telemedicine," Kiyoung Lee et al., IEEE, 2005.
"Stereoscopic TV over IP," Hewage et al., IEEE Explore, 2007.
"Real-Time Synchronous Multi-View Video Transport System over IP Networks," Jongryool Kim and Jong Won Kim, IEEE Transactions on Consumer Electronics, vol. 54, No. 2, May 2008.
"Stereoscopic Video Transmission over the Internet," Mathias Johanson, IEEE, 2001.
"Stereoscopic Player Overview," 3dtv.at, 2005-2008.
"Create, Share and Experience 3D!" WOWvx website, 2008.
Document Office Action, corresponding Mexican Application No. MX/a/2011/001996, Apr. 9, 2012.

* cited by examiner

*Primary Examiner* — Jerry Dennison
(74) *Attorney, Agent, or Firm* — Miller Patent Services; Jerry A. Miller

(57) ABSTRACT

A method of operation of a de-interlacer/scaler for display of stereoscopic images consistent with certain implementations involves at a de-interlacer/scaler, receiving consecutive frames of video information that contain alternating left and right eye images from a decoder; at the de-interlacer/scaler, disabling all image processing algorithms that utilize pixel data for temporally or spatially adjacent pixels that represent images, where at least one pixel is for the left eye and one pixel is for the right eye; and sending stereoscopic images from the de-interlacer/scaler to a display. This abstract is not to be considered limiting, since other embodiments may deviate from the features described in this abstract.

34 Claims, 4 Drawing Sheets

STEREOSCOPIC VIDEO DELIVERY

CROSS REFERENCE TO RELATED DOCUMENTS

This application is related to and claims priority benefit of U.S. Provisional Patent Application No. 61/190,990 filed Sep. 3, 2008, which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The human eye and brain utilize multiple cues for interpretation of depth, the slight differences in images as a result of separation of the human eyes is a very powerful cue. This is the basis for stereoscopic imaging as a mechanism for production of three dimensional (3D) video, wherein, stereoscopic content is produced using a real or virtual dual camera system with a horizontal separation between the two cameras to simulate the spacing of left and right eyes. A display system then presents separate left and right eye images to the viewer in order to produce the three dimensional effect. Common systems for providing selection between the left and right images include shutter glasses that temporally select images for the left and right eyes to correspond with images as displayed and passive glasses that separate the images either chromatically or by use of polarization of the images from the display. The polarization or chromatic content of the images can be presented with either spatial or temporal separation.

Recently, there has been a rapid growth in the availability of stereoscopic content from movie studios due to its' increased revenue during theatrical release. However, there are no widely established standards for the distribution of stereoscopic content to the home by optical disc, broadcast, cable, satellite or Internet protocol (IP) delivery.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

For clarity the following definitions will apply in the description of various components of the methods for the invention. Spatially Interleaved is defined as an image where the left and right image are presented at the same time on the odd and even lines or rows of the display. Temporally Interleaved is defined as the left and the right image being presented sequentially on the display. These definitions should not be construed to limit the scope of the invention but are for clarity in the description of one embodiment. The term 'images', as used herein, may be used to mean a series of images presented as a video.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Utilizing current video technology, there are several ways to, encode stereoscopic video images for use in providing three dimensional (3D) television (TV) images. It is desirable to utilize the current high definition television (HDTV) and digital television distribution infrastructure.

It is not practical to directly encode 3D images, for example, as interleaved images that incorporate both left eye and right eye images in a single frame. This is because video RGB signals are converted to luminance and chrominance signals, and normal decoding of such images uses half sampling of the chrominance signals ultimately resulting in crosstalk distortion of the images.

Moreover, for display of 3D images, one would expect to have to start from scratch in design of a de-interlacer/scaler depending upon what type of display is being used. Generally speaking, the most likely candidate displays use either interleaved left and right eye images that are separated by passive glasses, or use alternating right and left eye frames wherein the right and left eye information is separated by use of active shutter glasses that are synchronized with the images.

Figure 1:
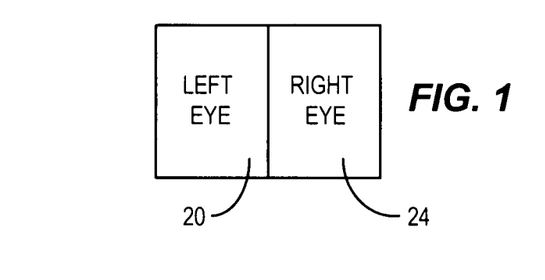
FIG. 1 is an example illustration of a video frame that utilizes left and right spatially separated stereoscopic video image arrangement consistent with certain embodiments of the present invention.

FIG. 1, depicts one example of a stereoscopic encoding method where the left eye and right eye images 20 and 24 respectively are spatially separated, wherein the images are compressed for transmission. For display, the images are decoded and must be presented in a format native to the display technology. For example, they are stretched horizontally and interleaved for viewing on a Spatially Interleaved display or stretched horizontally and presented sequentially for a Temporally Interleaved display. This is the mechanism used by the only known commercial distributor (as of this writing) to the consumer of commercial stereoscopic content. The content is supplied over a dedicated channel by the Japanese satellite channel BS-11. This commercial distribution is carried out using a 1080i MPEG-2 data stream for delivery of the content.

Figure 2:
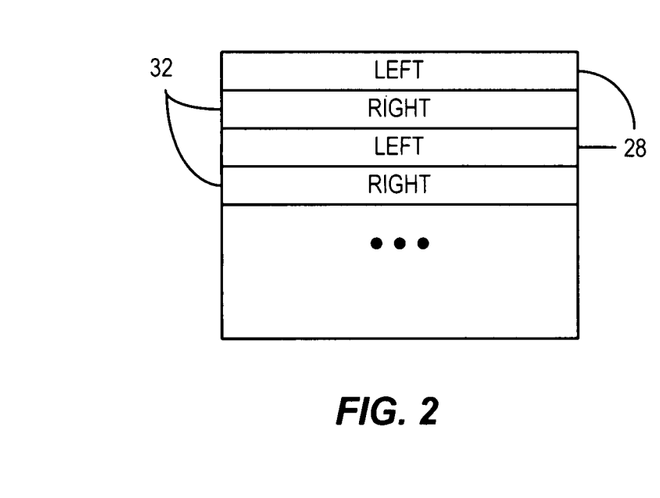
FIG. 2 is an example illustration of a video frame that utilizes Spatially Interleaved left and right images to spatially display the stereoscopic video image arrangement consistent with certain embodiments of the present inventions display method.

FIG. 2 depicts an interleaved version of a spatially separated display method, where left eye image 28 and right eye image 32 respectively are shown at the same time.

Figure 3:
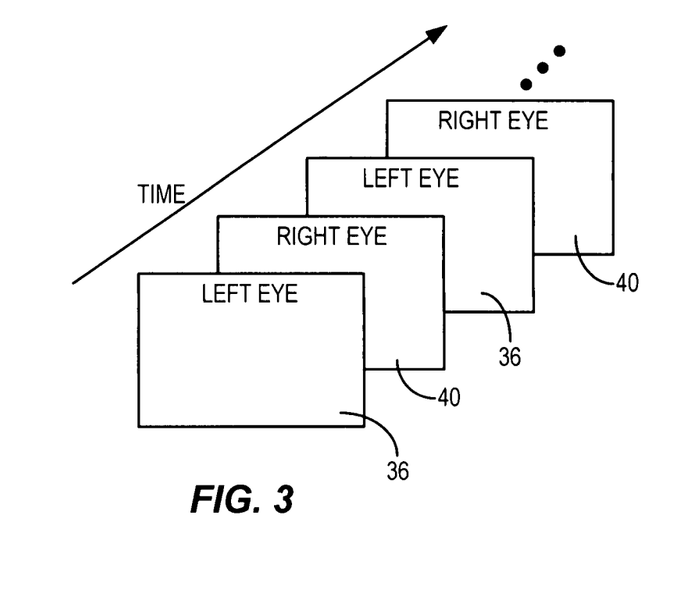
FIG. 3 is an example illustration of a Temporally Interleved stereoscopic video image arrangement consistent with certain embodiments of the present inventions display method.

Another technique for the display of the video is temporal separation of the left eye and right eye information as depicted in FIG. 3. In this arrangement, left eye images 36 are alternated with right eye images 40 in time sequence, i.e., time multiplexed on a frame by frame basis for alternating left and right eye views. In such an arrangement, the display system may alternately displays left eye and right eye images, and field sequentially synchronized shutter glasses are used that switch the user's view between left and right eye views.

Regardless of how the stereoscopic information is encoded, it is presented to the display device in a manner necessitated by the operational mode of the display when operating in 3D mode.

Systems have been proposed that utilize the native display format as the encoding format such that no conversion after decode takes place. Examples are the distribution of content encoded as checkerboard for field sequential DLP™ Displays. These formats are limited in that they cannot easily serve multiple display types; specifically a single encode method that can be used efficiently with temporally interleaved displays and spatially interleaved displays.

Figure 4:
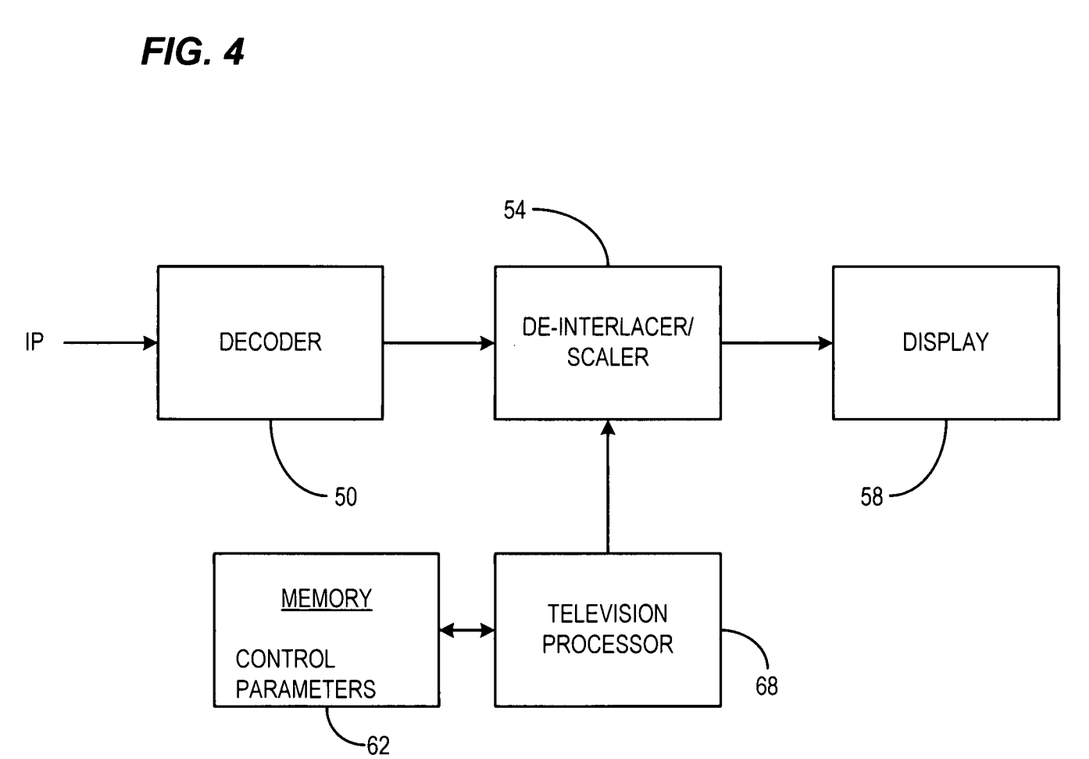
FIG. 4 is a block diagram depicting the three basic functional blocks of a video display system consistent with certain embodiments of the present invention.

Current hardware devices used in television displays and other distribution devices such as video disc players and other video distribution set-top boxes can be modified by appropriate manipulation to decode 3D content whether presented for display in a temporal format or a spatial format. For purposes of understanding embodiments consistent with the present invention, consider by way of example an Internet TV based embodiment as depicted in FIG. 4. In this embodiment, and in most cases for digital television programming delivery and display systems, there are three basic elements—a decoder 50, a de-interlacer/scaler 54 and a display 58. The decoder 50 takes the encoded content stream (e.g., from disc or IP stream) and decodes the content for ultimate display on the display. These elements may be partitioned in various ways. For example, an Internet protocol television (IPTV) may incorporate all three elements, whereas a video disk player or game console may incorporate the decoder and perhaps the de-interlacer/scaler 54 in communication with a display via, for example, an HDMI connection. In each case, however, the 3D source material is encoded at an encoder such that it is temporally encoded with field coding. This source material is then compressed in the encoding process for conveyance to the user (e.g., via the Internet or via a video disc, etc.)

In accord with embodiments consistent with the present invention, the 3D video can be decoded without regard for whether the display 58 is designed for display on temporally oriented display (using shutter glasses) or line interleaved display (using passive glasses). Decoder 50 is used in all instances to recreate the original image that was compressed in the encoding process.

FIG. 4, depicts the de-interlacer/scaler 54 as a hardware de-interlacer/scaler that is manipulated by the television device's control processor 68 to install control parameters from memory 62, however, one skilled in the art will recognize that de-interlacing (or in the case of 3D, de-interleaving) can be carried out using a programmed processor with a de-interlacer/scaler software module using the various programmed control parameters as well. In either case, the principle is the same for accomplishing the process consistent with embodiments of the present invention, and can be accomplished without need for design of a new hardware system for carrying out the de-interlacing function.

Most modern LCD displays and the like, only operate as progressive displays. To display interlaced content, de-interlacers are used to manipulate the content via manipulation of pixels and filling in the missing lines of content using various algorithms that detect motion and carry out image enhancement processes. This is designed to remove residual interlace artifacts for display in a more suitable manner for progressive frame based displays.

In accord with embodiments consistent with the present invention, whether the display 58 is designed to operate in a temporal mode or a spatial mode for 3D display, the operation of the de-interlacer/scaler can be manipulated to assure that the 3D images will properly display. De-interlacers utilize various algorithms with programmable or controllable parameters depicted as 62 that can be stored in memory along with program instructions used by a television processor 68 to load such parameters into the de-interlacer/scaler 54 (hardware or software based) that operate to provide an improved display of a television image by a variety of mechanisms. In each case, the objective of de-interlacing is usually to remove interlacing artifacts from a display that will present the information to the viewer as a progressive scanned image so as to present the user with an image that is optimized while introducing a minimum of its own artifacts. For example, de-interlacers may use various algorithms including field combination techniques such as weaving and blending or averaging adjacent fields, field extension techniques such as line doubling and half-sizing, as well as noise reduction, color enhancement and motion compensation techniques. The quality of such algorithms and their respective control parameters as programmed can have dramatic effects on the quality of image viewed. Moreover, the effectiveness of various techniques depends not only on the quality of the image manipulation carried out in the de-interlacer, but also upon the image itself and whether the image contains motion or still picture features.

By careful manipulation of these parameters, a 3D image can be rendered on the display without regard for the type of display (temporal based or interlaced based in a 3D mode). It should be noted that the parameters available for manipulation for any given commercial de-interlacer/scaler device or program module may number in the hundreds. Hence, it is impractical to describe with specificity exactly what parameter any particular de-interlacer/scaler might exactly be set to since the algorithms are often proprietary and vary from manufacturer to manufacturer. However, the guidance given below will assure that the proper parameters are manipulated to achieve the desired effect.

Figure 5:
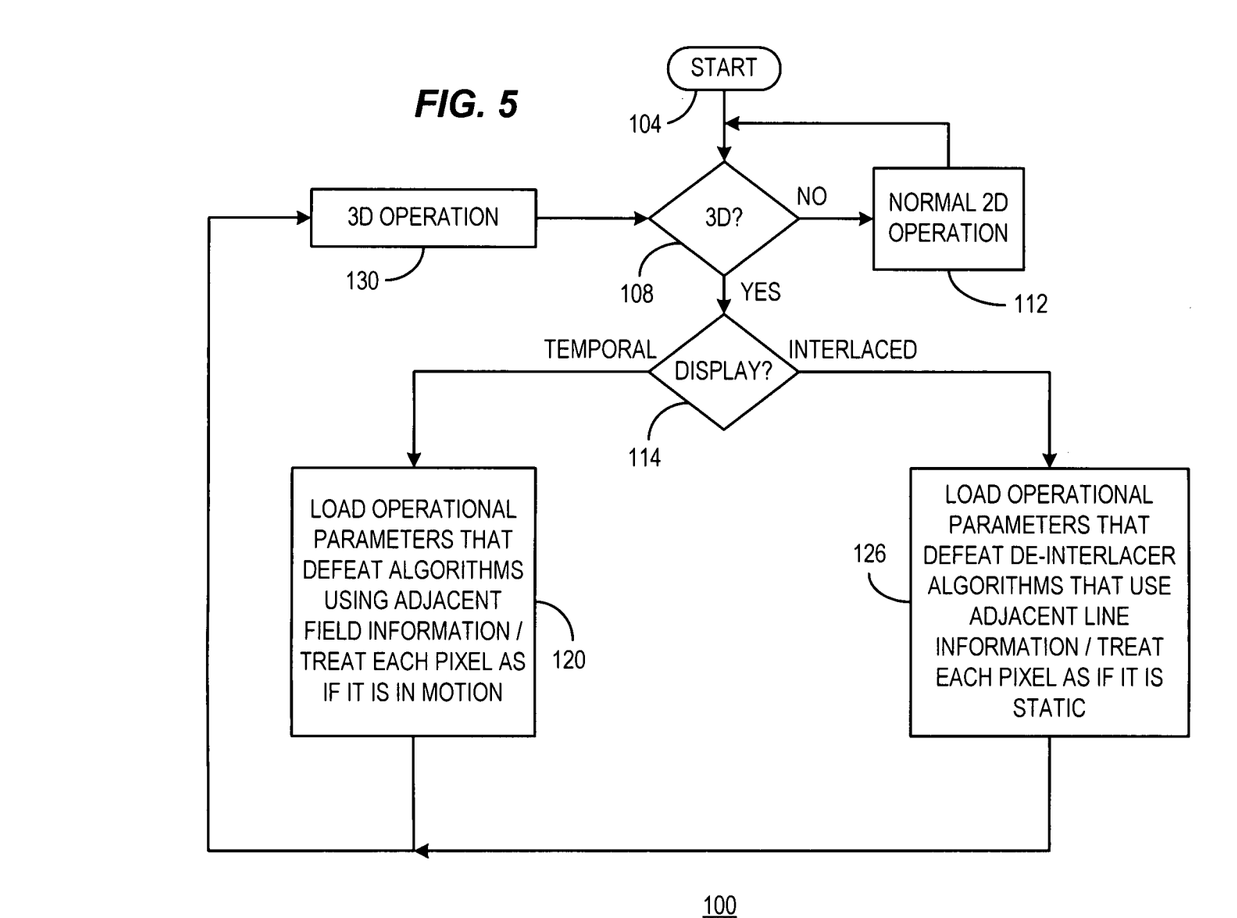
FIG. 5 is an example flow chart depicting the programming of a de-interlacer/scaler based upon whether the display is Spatially Interleaved or Temporally Interleaved in a manner consistent with certain embodiments of the present invention.

FIG. 5 depicts the process for manipulation of the control parameters for the de-interlacer/scaler so as to achieve the desired effects. The right side of the process depicts what happens in a Spatially Interleaved 3D display. The left side of the process depicts what happens in a Temporally Interleaved 3D display. To briefly summarize, if the image is displayed in a spatially interleaved mode, the parameters that are changed are those relating to any image enhancement process that involves manipulation of adjacent lines of video. If an algorithm in the de-interlacer/scaler utilizes information from adjacent lines above or below a current line to manipulate pixels in the final image, those algorithms are disabled. In this case, defeating these algorithms includes, for example, defeating motion detection. Thus, movement is treated as static and the interleaved lines are interleaved without benefit of determination if there is motion that should be compensated for in adjacent lines. That is, all picture elements are treated as though they are static. Therefore, the decoded image field that contains content for the left eye and the decoded image field that contains content for the right eye are blended into one image where the left image will appear on the odd lines and the right image will appear on the even lines. As this takes place after the decode the image contents are no longer constrained to exist in sub-sampled color space, and thus the issue of cross talk from left to right images is eliminated.

For a temporally based display that displays the 3D image as sequential frames of video, the de-interlacer/scaler is manipulated so as to disable any algorithm that relies on temporal frame information. That is, is the algorithm manipulates pixels of the image based on a temporally prior or next frame, of video, such algorithms are disabled. In this case, again motion detection is defeated so that movement between adjacent frames is not manipulated so that every pixel is essentially treated as though it is in motion. Therefore, the decoded image field that contains content for the left eye and the decoded image that contains content for the right eye are presented to the Temporally Interleaved display system sequentially. The display system could then further manipulate the field rate of the left and right image to reduce flicker.

By treating the image as such, the information for left eye and right eye are kept distinct, whether interlaced or temporal. Moreover, this can be accomplished without need for a specialized de-interlacer/scaler per se using either an interlace based or temporal based display system.

Referring to FIG. 5, a process 100 starts at 104 and depicts operation that depends upon a determination 108 that there is 3D (stereoscopic) content to be viewed (as determined by any suitable mechanism including signal coding, user input, program metadata, etc.). If not, the process defaults to any normal operational mode as is used to display two-dimensional content at 112, where this includes normal operation of the de-interlacer/scaler 54 utilizing any suitable parameters for 2D display operation that are loaded as a part of the normal operational cycle. If 3D content is present, the operation depends upon the type of display system being used at 114, i.e., whether the display is Temporally Interleaved (including but not limited to those that utilize shutter glasses or any other mechanism for actively or otherwise separating left and right images in a temporally interleaved display) or Spatially interleaved (including but not limited to those using passive glasses or any other mechanism for image separation in a spatially interleaved display). In the case of a temporal image format, the existing de-interlacer/scaler 54 is programmed to defeat all algorithms using adjacent field information so as to treat each pixel as if it is in motion at 120. This permits each sequential frame of video to be made independent of temporally adjacent video frames so as to properly enable separation of the left and right eye information using shutter glasses.

If at 114, an interleaved display is used for separation of the left and right eyes for 3D using passive chromatic or polarized separation of the images, the de-interlacer/scaler 54 is programmed at 126 to defeat all algorithms using adjacent line information so as to treat each pixel as if it is static. This permits each line of video to be made independent of adjacent lines in the video frame so as to properly enable separation of the left and right eye information using passive glasses.

In either instance, once 3D operation has been determined and the appropriate parameters loaded at the de-interlacer at 120, the display proceeds to display the 3D stereoscopic content for viewing by the viewer using display appropriate glasses at 130.

Figure 6:
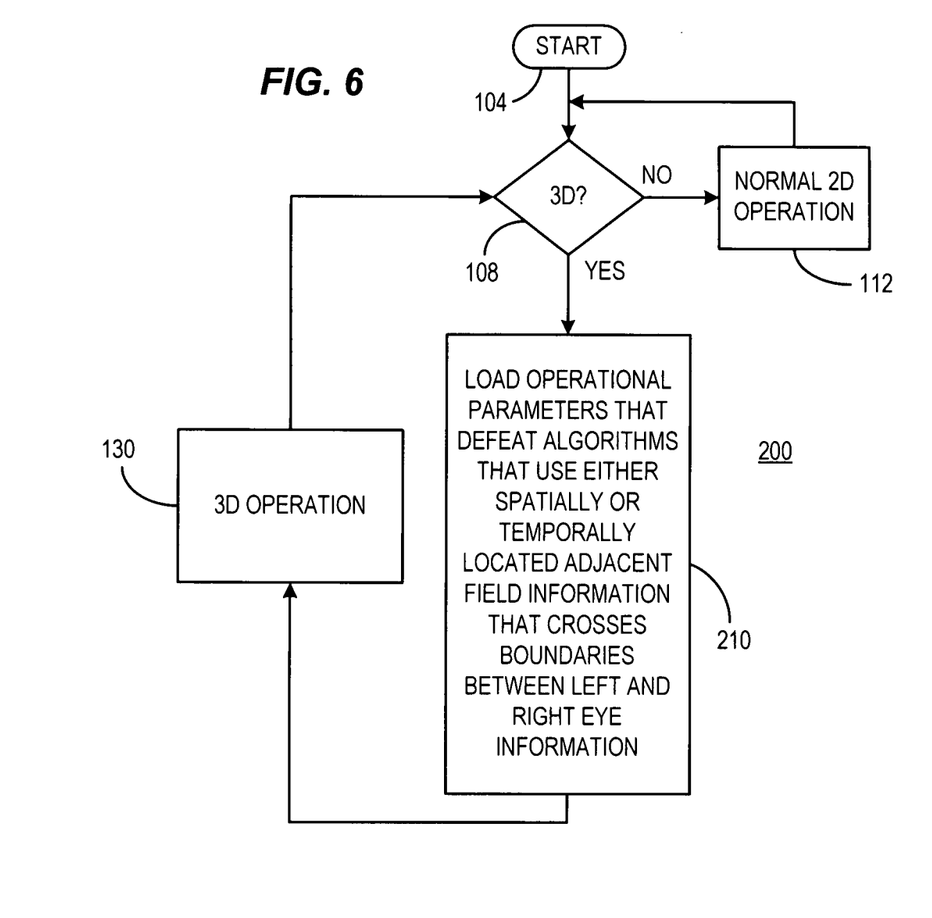
FIG. 6 is an example flow chart depicting the programming of a de-interlacer/scaler without regard for the display type for display of 3D stereoscopic content in a manner consistent with certain embodiments of the present invention.

FIG. 6 depicts a more general process 200 that describes how a de-interlacer/scaler is manipulated to assure proper operation in any given display environment. In all cases, it is presumed that the decoder recreates frames of 3D content as encoded at the source. In this case, when 3D content is to be displayed on the display, one can generalize to state that the de-interlacer/scaler 54 is programmed or parameters loaded therein at 210, or the mode set so as to defeat any algorithms that use either spatially or temporally located adjacent field information that crosses boundaries between left eye and right eye information. In other words, if two adjacent pixels—spatially or temporally—are a part of information intended for receipt by different eyes (left or right), any algorithm that would utilize information regarding both pixels to provide any type of image enhancement, noise reduction, motion compensation, etc. is to be defeated at 210 in order to correctly display the 3D image at 130. It may be possible to retain and utilize algorithms (or develop other algorithms) suitable for manipulation of adjacent pixels—spatially or temporally—that are only intended for viewing by a single eye in stereoscopic viewing mode.

The de-interlacer/scaler receives consecutive frames of video information with alternating left and right eye images, and may display the images in any manner that the video display is designed to display. However, the de-interlacer/scaler may output either consecutive frames of alternating left and right eye information, or may output frames wherein the left and right eye information are interleaved. In each case either temporally or spatially adjacent pixels left unutilized by image processing algorithms that utilize the adjacent pixels (temporally or spatially or both depending on the nature of the target display mechanism). This prevents the algorithms from distorting the left and right eye information by use of one (e.g., left) to adjust the other (e.g., right).

Thus, an example method of operation of a de-interlacer/scaler for display of stereoscopic images consistent with certain implementations involves at a de-interlacer/scaler, receiving consecutive frames of video information that contain alternating left and right eye images from a decoder; at the de-interlacer/scaler, disabling all image processing algorithms that utilize pixel data for temporally or spatially adjacent pixels that represent images, where at least one pixel is for the left eye and one pixel is for the right eye; and sending stereoscopic images from the de-interlacer/scaler to a display.

In certain implementations, the disabling is carried out by loading operational parameters into the de-interlacer/scaler that effectively disable said image processing algorithms. In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler incorporates motion detection algorithms, and wherein the motion detection algorithms are defeated at least when the motion detection algorithms utilize pixel data for temporally or spatially adjacent pixels that represent images, where at least one pixel is for the left eye and one pixel is for the right eye. In certain implementations the process further involves enabling at least one image processing algorithm at the de-interlacer/scaler that uses data from pixels for the same eye.

Another example method of operation of a de-interlacer/scaler for display of stereoscopic images involves at a programmable de-interlacer, receiving consecutive frames of video information that contain alternating left and right eye images from a decoder; at the programmable de-interlacer, disabling all image processing algorithms that utilize pixel data for temporally or spatially adjacent pixels that represent images, where at least one pixel is for the left eye and one pixel is for the right eye; wherein the de-interlacer/scaler incorporates motion detection algorithms, and wherein the motion detection algorithms are defeated at least when the motion detection algorithms utilize pixel data for temporally or spatially adjacent pixels that represent images, where at least one pixel is for the left eye and one pixel is for the right eye; wherein the disabling is carried out by loading operational parameters into the programmable de-interlacer/scaler that effectively disable said image processing algorithms; enabling at least one image processing algorithm at the de-interlacer/scaler that uses data from pixels for the same eye; and sending stereoscopic images from the de-interlacer/scaler to a display.

Another example implementation of a method of operation of a de-interlacer/scaler for display of stereoscopic images in an interleaved manner at a display involves at a de-interlacer, receiving consecutive frames of video information that contain alternating left and right eye images from a decoder; at the de-interlacer, disabling all image processing algorithms that utilize pixel data for spatially adjacent pixels that represent images, where at least one pixel is for the left eye and one pixel is for the right eye; and sending stereoscopic images from the de-interlacer/scaler to a display.

In certain implementations, the disabling is carried out by loading operational parameters into the de-interlacer/scaler that effectively disable said image processing algorithms. In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler incorporates motion detection algorithms, and wherein the motion detection algorithms are defeated at least when the motion detection algorithms utilize pixel data for spatially adjacent pixels that represent images, where at least one pixel is for the left eye and one pixel is for the right eye. In certain implementations, the method further involves enabling at least one image processing algorithm at the de-interlacer/scaler that uses data from pixels for the same eye.

Another example method of operation of a de-interlacer/scaler for display of stereoscopic images in a temporally alternating manner at a display involves at a de-interlacer, receiving consecutive frames of video information that contain alternating left and right eye images from a decoder; at the de-interlacer, disabling all image processing algorithms that utilize pixel data for temporally adjacent pixels that represent images, where at least one pixel is for the left eye and one pixel is for the right eye; and sending stereoscopic images from the de-interlacer/scaler to a display.

In certain implementations, the disabling is carried out by loading operational parameters into the de-interlacer/scaler that effectively disable said image processing algorithms. In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler incorporates motion detection algorithms, and wherein the motion detection algorithms are defeated at least when the motion detection algorithms utilize pixel data for temporally adjacent pixels that represent images, where at least one pixel is for the left eye and one pixel is for the right eye. In certain implementations, further involves enabling at least one image processing algorithm at the de-interlacer/scaler that uses data from pixels for the same eye.

A tangible computer readable electronic storage medium, such as a non-transitory storage medium (where the term "non-transitory" is intended only to exclude propagating waves and signals) can store instructions which, when executed on one or more programmed processors, carry out any of the methods described herein.

An example apparatus for display of stereoscopic video images consistent with certain implementations has a de-interlacer/scaler, receiving consecutive frames of decoded video information that contain alternating left and right eye images, the de-interlacer/scaler operating in accordance with stored operational parameters. A programmed processor loads operational parameters for use by the de-interlacer/scaler that disables all image processing algorithms that utilize pixel data for temporally or spatially adjacent pixels that represent images, where at least one pixel is for the left eye and one pixel is for the right eye for display of said pixels on a display.

In certain implementations, the de-interlacer/scaler is implemented as a software module running on a programmable processor. In certain implementations, the de-interlacer/scaler is implemented as a hardware de-interlacer/scaler with programmable de-interlacer/scaler operational parameters. In certain implementations, the de-interlacer/scaler incorporates motion detection algorithms, and where the motion detection algorithms are defeated at least when the motion detection algorithms utilize pixel data for temporally or spatially adjacent pixels that represent images, where at least one pixel is for the left eye and one pixel is for the right eye.

Those skilled in the art will recognize, upon consideration of the above teachings, that certain of the above exemplary embodiments are based upon use of a programmed hardware such as processor 68 and de-interlacer/scaler 54, programmed using control parameters and instructions stored at 62. (Hardware based de-interlacer/scaler devices suitable for use in certain embodiments are commercially available as, for example, the SMP-8634 from Sigma Designs). However, the invention is not limited to such exemplary embodiments, since other embodiments could be implemented using state machines, programmed processors using specific program modules to implement the de-interlacer/scaler functions, hardware component equivalents such as special purpose hardware and/or dedicated processors that can switch between two and three dimensional display modes based on a simple hardware command. Similarly, general purpose computers, microprocessor based computers, micro-controllers, optical computers, analog computers, dedicated processors, multiple processors, multiple core processors, application specific circuits and/or dedicated hard wired logic may be used to construct alternative equivalent embodiments.

While certain illustrative embodiments have been described, it is evident that many alternatives, modifications, permutations and variations will become apparent to those skilled in the art in light of the foregoing description.

What is claimed is:

1. A method of operation of a de-interlacer/scaler for display of stereoscopic images, comprising:
    determining whether or not stereoscopic images are to be displayed;
    if not, then:
        enabling image processing algorithms at a de-interlacer/scaler that utilize pixel data for temporally or spatially adjacent pixels that represent images, and at the de-interlacer/scaler, receiving consecutive frames of video information representing the images; and
        sending non-stereoscopic images from the de-interlacer/scaler to a display;
    if so, then:
        at the de-interlacer/scaler, receiving consecutive frames of video information that contain alternating left and right eye images from a decoder, and
        at the de-interlacer/scaler, disabling all image processing algorithms that utilize pixel data for temporally or spatially adjacent pixels that represent images, where at least one pixel is for the left eye and one pixel is for the right eye;
        at the de-interlacer/scaler, carrying out at least one image processing algorithm that does not utilize pixel data for temporally or spatially adjacent pixels that represent images; and
        sending stereoscopic images from the de-interlacer/scaler to the display.

2. A method of operation of a de-interlacer/scaler for display of stereoscopic images, comprising:
    determining whether or not stereoscopic images are to be displayed;
    if not, then:
        at a de-interlacer/scaler, receiving consecutive frames of video information representing the images,
        enabling an image enhancement algorithm at the de-interlacer/scaler that manipulates pixels of the images using a temporally prior or next frame of the image, or an image enhancement algorithm at the de-interlacer/scaler that manipulates pixels of the images using spatially adjacent pixels in the images,
        processing the consecutive frames of video information representing the images at the de-interlacer/scaler using the enabled image enhancement algorithm, and
        sending non-stereoscopic images from the de-interlacer/scaler to a display;
    if so, then:
        at the de-interlacer/scaler, receiving consecutive frames of video information that contain left and right eye stereoscopic images from a decoder,
        at the de-interlacer/scaler, disabling all image enhancement algorithms that manipulate pixels of the images using a temporally prior or next frame of the images, and disabling all image enhancement algorithms which manipulate pixels of the images using spatially adjacent pixels in the images,
        at the de-interlacer/scaler, carrying out at least one image enhancement algorithm that does not utilize pixel data for temporally or spatially adjacent pixels that represent images, and
        sending stereoscopic images from the de-interlacer/scaler to the display.

3. The method according to claim 2, where the disabling is carried out by loading operational parameters into the de-interlacer/scaler that effectively disable said image enhancement algorithms.

4. The method according to claim 3, where the de-interlacer/scaler is implemented as a software module running on a programmable processor.

5. The method according to claim 3, where the de-interlacer/scaler is implemented as a hardware de-interlacer/scaler with programmable de-interlacer/scaler operational parameters.

6. The method according to claim 2, where the de-interlacer/scaler is implemented as a software module running on a programmable processor.

7. The method according to claim 2, where the de-interlacer/scaler is implemented as a hardware de-interlacer/scaler with programmable de-interlacer/scaler operational parameters.

8. The method according to claim 2, where the de-interlacer/scaler incorporates at least one motion detection algorithm, and where the motion detection algorithm is disabled if stereoscopic images are to be displayed.

9. The method according to claim 1, further comprising enabling at least one image enhancement algorithm at the de-interlacer/scaler that uses data from pixels for a same eye image.

10. A tangible non-transitory computer readable electronic storage medium storing instructions which, when executed on one or more programmed processors, carry out a method comprising:
   determining whether or not stereoscopic images are to be displayed;
   if not, then:
      at a de-interlacer/scaler, receiving consecutive frames of video information representing the images,
      enabling an image enhancement algorithm at the de-interlacer/scaler that manipulates pixels of the images using a temporally prior or next frame of the image, or an image enhancement algorithm at the de-interlacer/scaler that manipulates pixels of the images using spatially adjacent pixels in the images,
      processing the consecutive frames of video information representing the images at the de-interlacer/scaler using the enabled image enhancement algorithm, and
      sending non-stereoscopic images from the de-interlacer/scaler to a display;
   if so, then:
      at the de-interlacer/scaler, receiving consecutive frames of video information that contain left and right eye stereoscopic images from a decoder,
      at the de-interlacer/scaler, disabling all image enhancement algorithms that manipulate pixels of the images using a temporally prior or next frame of the images, and disabling all image enhancement algorithms which manipulate pixels of the images using spatially adjacent pixels in the images,
      at the de-interlacer/scaler, carrying out at least one image enhancement algorithm that does not utilize pixel data for temporally or spatially adjacent pixels that represent images, and
      sending stereoscopic images from the de-interlacer/scaler to the display.

11. A method of operation of a de-interlacer/scaler for display of stereoscopic images, comprising:
   determining whether or not stereoscopic images are to be displayed;
   if not, then:
      at a programmable de-interlacer/scaler, receiving consecutive frames of video information representing the images,
      enabling an image enhancement algorithm at the programmable de-interlacer/scaler that manipulates pixels of the images using a temporally prior or next frame of the image, or an image enhancement algorithm at the de-interlacer/scaler that manipulates pixels of the images using spatially adjacent pixels in the images,
      processing the consecutive frames of video information representing the images at the de-interlacer/scaler using the enabled image enhancement algorithm, and
      sending non-stereoscopic images from the programmable de-interlacer/scaler to a display;
   if so, then:
      at the programmable de-interlacer/scaler, receiving consecutive frames of video information that contain alternating left and right eye stereoscopic images from a decoder,
      at the programmable de-interlacer, disabling all image enhancement algorithms that manipulate pixels of the images using a temporally prior or next frame of the images, and disabling all image enhancement algorithms which manipulate pixels of the images using spatially adjacent pixels in the images,
      where the programmable de-interlacer/scaler incorporates a motion detection algorithm, and where the motion detection algorithm is disabled by loading operational parameters into the de-interlacer/scaler that effectively disables the motion detection algorithm when a stereoscopic image is to be displayed, and
      enabling at least one image enhancement algorithm at the programmable de-interlacer/scaler that uses data from pixels for the same eye; and
      sending stereoscopic images from the programmable de-interlacer/scaler to the display.

12. A method of operation of a de-interlacer for display of stereoscopic images in an interleaved manner at a display, comprising:
   determining whether or not stereoscopic images are to be displayed;
   if not, then:
      at a de-interlacer, receiving consecutive frames of video information representing the images,
      enabling an image enhancement algorithm at the de-interlacer that manipulates pixels of the images using a temporally prior or next frame of the image, or an image enhancement algorithm at the de-interlacer that manipulates pixels of the images using spatially adjacent pixels in the images,
      processing the consecutive frames of video information representing the images at the de-interlacer using the enabled image enhancement algorithm, and
      sending non-stereoscopic images from the de-interlacer to a display;
   if so, then:
      at the de-interlacer, receiving consecutive frames of video information that contain alternating left and right eye images from a decoder;
      at the de-interlacer, disabling all image enhancement algorithms that manipulate pixels of the images using a temporally prior or next frame of the images, and disabling all image enhancement algorithms which manipulate pixels of the images using spatially adjacent pixels in the images,
      at the de-interlacer, carrying out at least one image enhancement algorithm that does not utilize pixel data for temporally or spatially adjacent pixels that represent images; and
      sending stereoscopic images from the de-interlacer/scaler to the display.

13. The method according to claim 12, where the disabling is carried out by loading operational parameters into the de-interlacer that effectively disable said image enhancement algorithms.

14. The method according to claim 13, where the de-interlacer is implemented as a software module running on a programmable processor.

15. The method according to claim 13, where the de-interlacer is implemented as a hardware de-interlacer with programmable de-interlacer operational parameters.

16. The method according to claim 12, where the de-interlacer is implemented as a software module running on a programmable processor.

17. The method according to claim 12, where the de-interlacer is implemented as a hardware de-interlacer with programmable de-interlacer operational parameters.

18. The method according to claim 12, where the de-interlacer incorporates a motion detection algorithm, and where the motion detection algorithm is defeated when stereoscopic images are to be displayed.

19. The method according to claim 12, further comprising enabling at least one image enhancement algorithm at the de-interlacer that uses data from pixels for the same eye.

20. A tangible non-transitory computer readable electronic storage medium storing instructions which, when executed on one or more programmed processors, carry out a method comprising:
determining whether or not stereoscopic images are to be displayed;
if not, then:
at a de-interlacer, receiving consecutive frames of video information representing the images,
enabling an image enhancement algorithm at the de-interlacer that manipulates pixels of the images using a temporally prior or next frame of the image, or an image enhancement algorithm at the de-interlacer that manipulates pixels of the images using spatially adjacent pixels in the images,
processing the consecutive frames of video information representing the images at the de-interlacer using the enabled image enhancement algorithm, and
sending non-stereoscopic images from the de-interlacer to a display;
if so, then:
at the de-interlacer, receiving consecutive frames of video information that contain alternating left and right eye images from a decoder;
at the de-interlacer, disabling all image enhancement algorithms that manipulate pixels of the images using a temporally prior or next frame of the images, and disabling all image enhancement algorithms which manipulate pixels of the images using spatially adjacent pixels in the images,
at the de-interlacer, carrying out at least one image enhancement algorithm that does not utilize pixel data for temporally or spatially adjacent pixels that represent images; and
sending stereoscopic images from the de-interlacer/scaler to the display.

21. A method of operation of a de-interlacer for display of stereoscopic images in a temporally alternating manner at a display, comprising:
determining whether or not stereoscopic images are to be displayed;
if not, then:
at a de-interlacer, receiving consecutive frames of video information representing the images,
enabling an image enhancement algorithm at the de-interlacer that manipulates pixels of the images using a temporally prior or next frame of the image,
processing the consecutive frames of video information representing the images at the de-interlacer using the enabled image enhancement algorithm, and
sending non-stereoscopic images from the de-interlacer to a display;
if so, then:
at the de-interlacer, receiving consecutive frames of video information that contain alternating left and right eye images from a decoder;
at the de-interlacer, disabling all image enhancement algorithms that manipulate pixels of the images using a temporally prior or next frame of the images,
at the de-interlacer, carrying out at least one image enhancement algorithm that does not utilize pixel data for temporally adjacent pixels that represent images; and
sending stereoscopic images from the de-interlacer to the display.

22. The method according to claim 21, where the disabling is carried out by loading operational parameters into the de-interlacer that effectively disable said image enhancement algorithms.

23. The method according to claim 22, where the de-interlacer is implemented as a software module running on a programmable processor.

24. The method according to claim 22, where the de-interlacer is implemented as a hardware de-interlacer with programmable de-interlacer operational parameters.

25. The method according to claim 21, where the de-interlacer is implemented as a software module running on a programmable processor.

26. The method according to claim 21, where the de-interlacer is implemented as a hardware de-interlacer with programmable de-interlacer operational parameters.

27. The method according to claim 21, where the de-interlacer incorporates a motion detection algorithm, and where the motion detection algorithm is defeated when stereoscopic images are to be displayed.

28. The method according to claim 21, further comprising enabling at least one image enhancement algorithm at the de-interlacer that uses data from pixels for the same eye when stereoscopic images are to be displayed.

29. A tangible non-transitory computer readable electronic storage medium storing instructions which, when executed on one or more programmed processors, carry out a method comprising:
determining whether or not stereoscopic images are to be displayed;
if not, then:
at a de-interlacer, receiving consecutive frames of video information representing the images,
enabling an image enhancement algorithm at the de-interlacer that manipulates pixels of the images using a temporally prior or next frame of the image, or an image enhancement algorithm at the de-interlacer that manipulates pixels of the images using spatially adjacent pixels in the images,
processing the consecutive frames of video information representing the images at the de-interlacer using the enabled image enhancement algorithm, and
sending non-stereoscopic images from the de-interlacer to a display;
if so, then:
at the de-interlacer, receiving consecutive frames of video information that contain alternating left and right eye images from a decoder;
at the de-interlacer, disabling all image enhancement algorithms that manipulate pixels of the images using a temporally prior or next frame of the images, and disabling all image enhancement algorithms which manipulate pixels of the images using spatially adjacent pixels in the images, at the de-interlacer, carrying out at least one image enhancement algorithm that does not utilize pixel data for temporally or spatially adjacent pixels that represent images; and sending stereoscopic images from the de-interlacer to the display.

30. An apparatus for display of stereoscopic video images, comprising:

a de-interlacer, receiving consecutive frames of decoded video information that contain alternating left and right eye images, the de-interlacer operating in accordance with stored operational parameters;

a programmed processor that, when operating in a stereoscopic mode, loads operational parameters for use by the de-interlacer that disables all image enhancement algorithms all image enhancement algorithms that manipulate pixels of the images using a temporally prior or next frame of the images, and disabling all image enhancement algorithms which manipulate pixels of the images using spatially adjacent pixels in the images;

the programmed processor further operating to load operational parameters for use by the de-interlacer/scaler that enables at least one image enhancement algorithm that does not utilize pixel data for temporally or spatially adjacent pixels that represent images when operating in the stereoscopic mode; and when the processor is operating in a non-stereoscopic mode, loads operational parameters for use by the de-interlacer that enables operation of at least one image enhancement algorithm that manipulates pixels of the images using a temporally prior or next frame of the image, or an image enhancement algorithm at the de-interlacer that manipulates pixels of the images using spatially adjacent pixels in the images for display of said pixels on the display.

31. The apparatus according to claim 30, where the de-interlacer is implemented as a software module running on a programmable processor.

32. The apparatus according to claim 30, where the de-interlacer is implemented as a hardware de-interlacer with programmable de-interlacer operational parameters.

33. The apparatus according to claim 30, where the de-interlacer incorporates a motion detection algorithm, and where the motion detection algorithm is defeated stereoscopic images are to be displayed.

34. An apparatus for display of stereoscopic video images, comprising:

a video processing device configured to receive consecutive frames of decoded video information that contain alternating left and right eye images, the video processing device being configured to operate in accordance with stored operational parameters;

a programmed processor programmed to operate in a stereoscopic mode to load operational parameters for use by the video processing device that disables all image enhancement algorithms that manipulate pixels of the images using a temporally prior or next frame of the images, and disabling all image enhancement algorithms which manipulate pixels of the images using spatially adjacent pixels in the images and to load operational parameters for use by the image processor that enables at least one image enhancement algorithm that does not utilize pixel data for temporally or spatially adjacent pixels that represent images when operating in the stereoscopic mode; and where the processor is further programmed to operate in a non-stereoscopic mode in which the processor is configured to load operational parameters for use by the video processing device that enables operation of at least one image enhancement algorithm that that manipulates pixels of the images using a temporally prior or next frame of the image, or an image enhancement algorithm at the de-interlacer/scaler that manipulates pixels of the images using spatially adjacent pixels in the images.

* * * * *